(12) United States Patent
Hasegawa

(10) Patent No.: US 6,904,536 B2
(45) Date of Patent: Jun. 7, 2005

(54) SEMICONDUCTOR CIRCUIT AND FUNCTIONAL BLOCK INCLUDING SYNCHRONIZING CIRCUIT FOR DETERMINING OPERATION TIMING

(75) Inventor: Shinya Hasegawa, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 718 days.

(21) Appl. No.: 09/895,997

(22) Filed: Jun. 28, 2001

(65) Prior Publication Data

US 2002/0000863 A1 Jan. 3, 2002

(30) Foreign Application Priority Data

Jun. 29, 2000 (JP) ........................................ 2000-196868

(51) Int. Cl.[7] .............................. G06F 1/04; H03K 3/00
(52) U.S. Cl. ........................ 713/400; 713/502; 327/297
(58) Field of Search ................................ 713/500, 502, 713/400; 327/297

(56) References Cited

U.S. PATENT DOCUMENTS

| | | | | |
|---|---|---|---|---|
| 5,640,373 A | * | 6/1997 | Davis | 368/156 |
| 5,961,649 A | * | 10/1999 | Khandekar et al. | 713/400 |
| 6,092,210 A | * | 7/2000 | Larky et al. | 713/400 |
| 6,279,058 B1 | * | 8/2001 | Gulick | 710/58 |
| 6,370,644 B1 | * | 4/2002 | LaBerge | 713/1 |
| 6,425,046 B1 | * | 7/2002 | Leung et al. | 711/101 |
| 6,584,575 B1 | * | 6/2003 | Meyer et al. | 713/400 |
| 6,629,254 B1 | * | 9/2003 | Naqvi et al. | 713/401 |

FOREIGN PATENT DOCUMENTS

| | | |
|---|---|---|
| JP | 7-306827 | 11/1995 |
| JP | 8-223247 | 8/1996 |
| JP | 9-185582 | 7/1997 |
| JP | 9-218849 | 8/1997 |
| JP | 9-251440 | 9/1997 |
| JP | 2000-47978 | 2/2000 |
| JP | 2000-137744 | 5/2000 |
| TW | 354395 | 3/1999 |
| WO | WO96/38793 | * 12/1996 |

OTHER PUBLICATIONS

Japanese Office Action dated Oct. 1, 2004 corresponding to Japanese Paten Application No. 2000–196868 and an English translation of same.

* cited by examiner

*Primary Examiner*—Chun Cao
(74) *Attorney, Agent, or Firm*—DLA Piper Rudnick Gray Cary US LLP

(57) ABSTRACT

The burden of developing a complex bridge block imposed on the IP reuser is reduced by introducing a system clock into the IP. The IP composed of a functional circuit of this invention and its synchronizing circuit takes in the system clock by integrating the synchronizing circuit taking in the system clock with the IP functional circuit into the IP in reusing the IP complying with the standard in the development of an LSI with a built-in IP and its derivatives. This enables the reuser to incorporate the IP into the LSI via a simple bridge block, taking into account only the system clock for driving the system bus, which reduces the burden of handling the IP and increases the reusability of the IP.

6 Claims, 3 Drawing Sheets

SEMICONDUCTOR CIRCUIT AND FUNCTIONAL BLOCK INCLUDING SYNCHRONIZING CIRCUIT FOR DETERMINING OPERATION TIMING

CROSS-REFERENCE TO RELATED APPLICATIONS

This application is based upon and claims the benefit of priority from the prior Japanese Patent Application No. 2000-196868, filed Jun. 29, 2000, the entire contents of which are incorporated herein by reference.

BACKGROUND OF THE INVENTION

This invention relates to the design of IP (Intellectual Property), and more particularly to a synchronizing circuit which enables an exchange of signals between an IP functional circuit and a system bus using two types of clocks: a local clock for driving the IP functional circuit built in an LSI and a system clock for driving the system bus.

Furthermore, the present invention integrates the IP functional circuit and the synchronizing circuit into an entity and uses the resulting circuit as an IP (functional block) in the design of an LSI. The invention includes a semiconductor integrated circuit containing the IP functional circuit and synchronizing circuit.

Using FIG. 1, conventional IP designs will be explained. Some of the conventional IP designs depend on the system bus and the others do not depend on the system bus. FIG. 1 shows an example of an IP design depending on the system bus. Numeral 1 indicates the system bus for transmitting the input and output signals of an IP. The system bus operates in synchronization with a system clock. Numeral 2 indicates an IP to be designed, which operates in synchronization with the system clock and local clock.

In the conventional IP design shown in FIG. 1, since the IP 2 itself is designed dependently on a specific system bus 1, the IP 2 can be used as it is, regardless of the difference in frequency between the system clock and local clock, in reusing the IP 2 for 94 the design of an LSI with a specific system bus 1.

Because the IP vendor must prepare a separate IP for each of the various system buses, this decreases the efficiency of the IP vendor. To avoid this, an IP design independent of the system bus as shown in FIG. 2 has been used.

In FIG. 2, IP 3 indicates a circuit which synchronizes with only the local clock and which is connected to the system bus 1 via a bridge block 4 that absorbs the difference between the system clock and local clock. Specifically, a circuit 5 composed of the IP 3 and the bridge block 4 is connected to the system bus 1 synchronizing with the system clock.

The bridge block is a circuit block which enables signal exchange between the IP bus synchronizing with the local clock and the system bus synchronizing with the system clock and which includes a circuit that synchronizes with both of the local clock and system clock.

As shown by vertical broken lines and single-dash-dot lines in FIG. 3, the rising or falling edges of the local clock generally containing a plurality of clocks have to be synchronized with the system clock in various modes. Because the duration time of the high level or low level of the local clock has to be set to a different length according to the function of the IP, the design of a bridge block is complex.

The bridge block is developed by the IP reuser. Therefore, in the conventional IP design using a bridge block, since the bridge block absorbs the difference between clocks, this imposes on the IP reuser the heavy burden of developing a complex circuit constituting a bridge block, which causes the problem of lengthening the time required for development.

As described above, in the conventional IP design, IP design dependent on the system bus requires the IP vendor to prepare an IP corresponding to each of the various system buses, whereas IP design independent of the system bus causes the problem of imposing on the IP reuser the heavy burden of developing a complex bridge block for absorbing the difference between the system clock and local clock.

BRIEF SUMMARY OF THE INVENTION

The IP (functional block) of this invention takes in the system clock by integrating a synchronizing circuit taking in the system clock with an IP functional circuit into the IP in reusing the IP complying with the standard in the development of an LSI with a built-in IP and its derivatives. This enables the reuser to incorporate the IP into the LSI using a simple bridge block, taking into account only the system clock, which reduces the burden of handling the IP on the IP reuser and increases the reusability of the IP.

Specifically, each of a functional block of the present invention and a semiconductor integrated circuit including the functional block, comprises: a system bus synchronizing with a system clock; a functional circuit synchronizing with a local clock; and a synchronizing circuit for determining the operation timing for signal exchange between the system bus and the functional circuit, wherein the synchronizing circuit takes in the system clock and the local clock and determines the operation timing by determining the access time for the functional circuit from the system clock.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In embodiments of the present invention, IP means the intellectual property of a functional block with a specific function built in an LSI. In developing LSIs and their derivatives, all the data about the design of functional blocks and others requiring a long time for development is handed over as intellectual property and reused in developing new products.

Use of an IP functional circuit, an IP composed of its synchronizing circuit, and an LSI incorporating these circuits enables inherited known intellectual property concerning the design of IP to be used effectively in reusing IP functional blocks in LSIs and their derivatives, which contributes to a reduction in development cost.

Hereinafter, referring to the accompanying drawings, embodiments of the present invention will be described in detail.

<First Embodiment>

FIGS. 4 to 7 are diagrams to help explain an IP (functional block) design that integrates an IP functional circuit according to a first embodiment of the present invention and its synchronizing circuit into an entity. Using FIG. 4, the outline of the IP design related to the first embodiment will be described.

Figure 4:
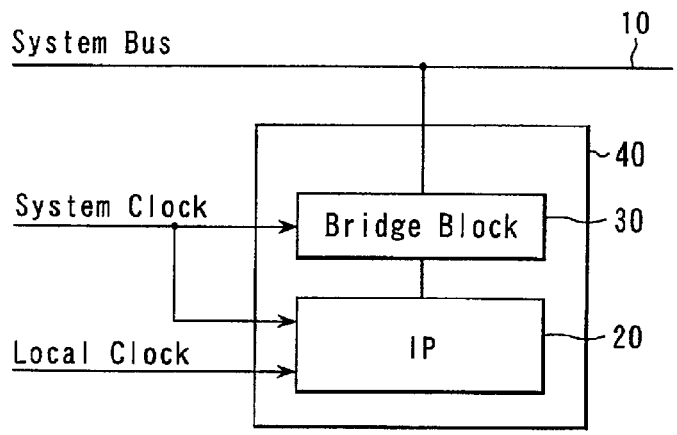
FIG. 4 is a diagram to help give a general explanation of IP design according to a first embodiment of the present invention.

In the IP design of FIG. 4, an IP (functional block) 20 that takes in a system clock and operates according to a local clock is connected to a bridge block 30 that synchronizes only with the system clock. A circuit 40 composed of the IP 20 and bridge block 30 is connected to a system bus 10.

Figure 1:
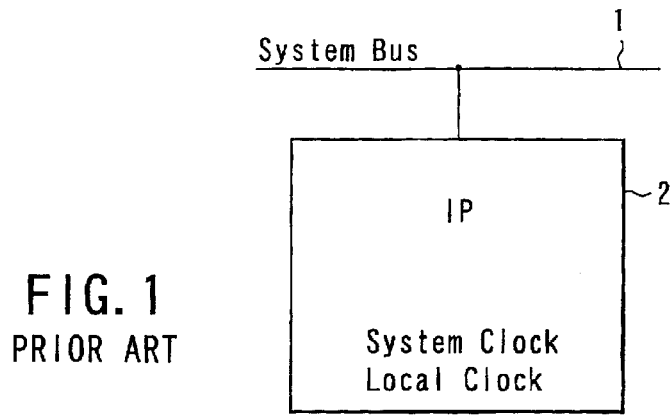
FIG. 1 is a diagram to help explain a conventional IP design.
Figure 2:
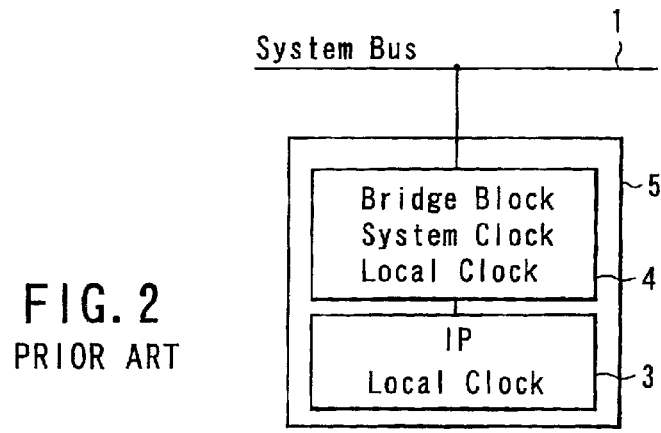
FIG. 2 is a diagram to help explain a conventional IP design independent of the system bus.

In the IP design of the present invention shown in FIG. 4, the system clock is synchronized with the local clock in the IP 20. Therefore, unlike the conventional bridge block 4 (see FIG. 2), the bridge block 30 of the present invention requires only the system clock to be taken into account. This facilitates the design of the bridge block, shortening the time required for development.

Figure 5:
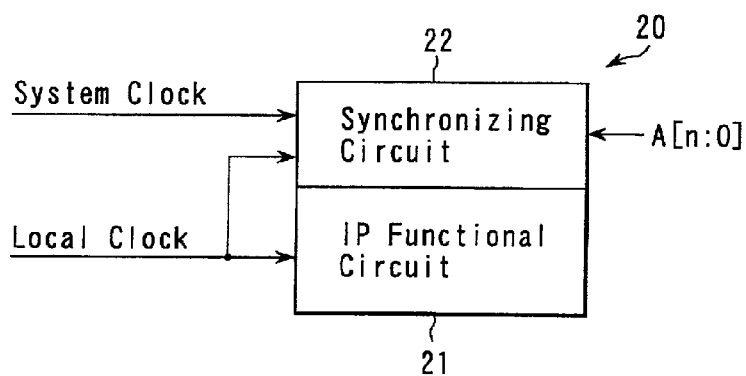
FIG. 5 shows the configuration of the IP according to the first embodiment.

Next, using FIG. 5, the configuration of the IP 20 of the first embodiment will be explained. The IP 20 of FIG. 5 is composed of an IP functional circuit 21 synchronizing with the local clock and a synchronizing circuit 22 that takes in the system clock and synchronizes with the local clock.

At the stage of designing the IP 20, the frequency of the system clock is unknown. Using a system clock frequency specifying signal A[n:0] (n is a natural number), the synchronizing circuit 22 built in the IP 20 takes in information on the system clock (for example, specific frequency) and matches the system clock with the local clock in the IP 20 via the frequency specifying signal A[n:0]; which enables IP design corresponding to the frequency of various system clocks.

The system clock frequency specifying signal A[n:0] is supplied from an external pin of the LSI using the IP 20, an internal pull-up of the LSI (connection to an internal power supply voltage level), an internal pull-down of the LSI (connection to the ground level), or the bridge block 30. The supply of the system clock frequency specifying signal A[n:0] from the bridge block 30 would make it possible to cope with a system whose system clock is variable.

Figure 6:
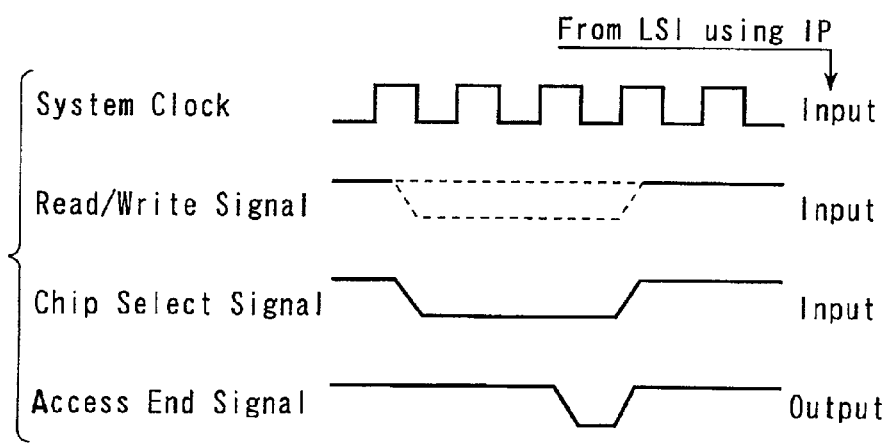
FIG. 6 shows the system clock and timing waveform of register access.

Next, using FIGS. 6 and 7, the operation of the synchronizing circuit 22 (see FIG. 5) included in the IP 20 will be explained. At the top of FIG. 6, a timing waveform of the system clock is shown. The second to fourth stages in FIG. 6 show timing waveforms of register access, provided that the IP functional circuit 21 (see FIG. 5) synchronizing with, for example, the local clock is composed of a register. Here, the system clock is a clock signal for synchronizing all the signals in the LSI to be transmitted to the system bus 10 (see FIG. 4) and the local clock is a clock signal for register access.

For instance, as shown in the second to fourth stages in FIG. 6, the reading/writing of the register is done in synchronization with the local clock on the basis of a read/write signal and chip select signal supplied from the IP-using LSI. At the time of the completion of the read/write operation, an access end signal is returned to the LSI. A series of these operations constitutes a read/write cycle of the register.

Figure 3:
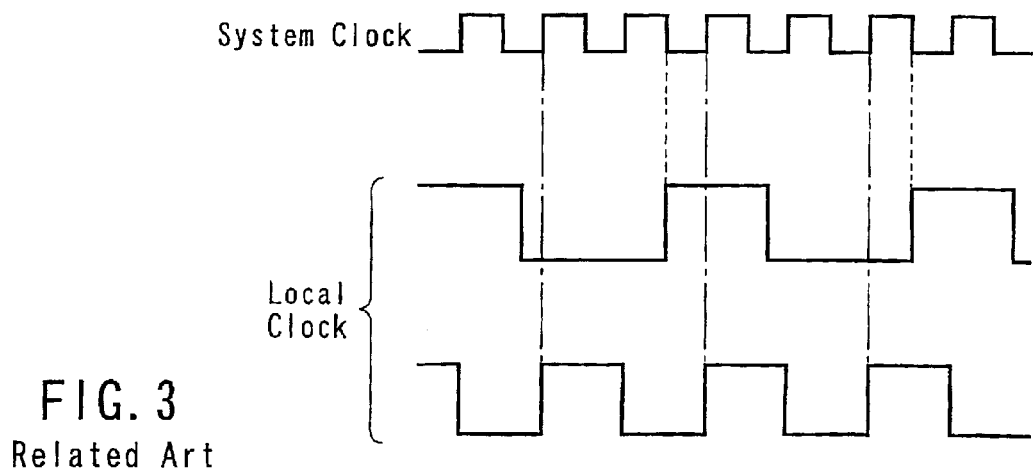
FIG. 3 shows the relationship between the system clock and local clock.

For instance, in the timing waveform shown in FIG. 6, the conventional bridge block 4 had to synchronize the system clock with the local clock in a complex manner to produce the timing waveform necessary for register access (for example, see FIG. 3). In contrast, the first embodiment can produce the timing waveform necessary for register access using the system clock and the system clock frequency specifying signal A[n:0].

Figure 7:
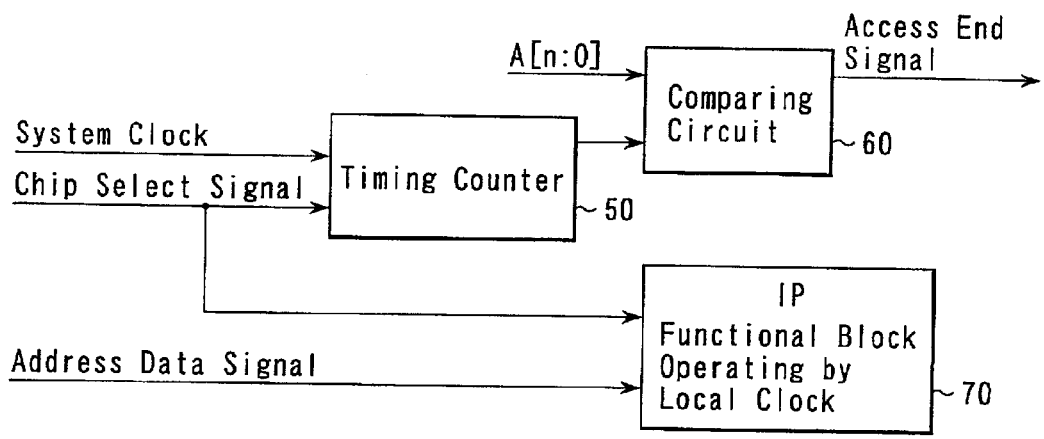
FIG. 7 is a diagram showing a concrete configuration of the IP.

FIG. 7 shows a concrete configuration of the IP 20 where the IP functional circuit 21 having such a function and the synchronizing circuit 22 are integrated into an entity. The IP 20 is composed of a timing counter 50, a comparing circuit 60, and an IP functional block 70 operating by the local clock.

As shown in FIG. 7, the timing counter 50 is actuated by the chip select signal, thereby starting the count of the system clock. The comparing circuit 60 compares the count of the timing counter 50 with the frequency specifying signal A[n:0] and transmits an access end signal at the time when the result of the comparison has reached a specific judgment reference.

On the other hand, the input of the chip select signal and address data signal causes the IP functional circuit 70 (register) to be accessed for processing. Then, in the IP functional circuit 70, a data input/output cycle (a register read/write cycle) is executed in synchronization with the local clock.

Externally supplying the system clock frequency specifying signal A[n:0] enables the count of the system clock in the counter to be aligned with the end time of the data input/output cycle of the IP functional circuit 70 operating according to the local clock, thereby transmitting an access end signal, which completes a series of data input/output cycles of the IP functional circuit 70.

Since the local clock is already known at the time of IP design, the timing with which a key signal is taken in according to the clock is also known. Then, in the circuit of FIG. 7, the system clock frequency specifying signal A[n:0] is externally supplied and the access time is determined using the count of the system clock as a reference. For instance, measuring the timing of returning the access end signal to the LSI makes it possible to adjust the IP 20 so that it can take in the effective time of the chip signal.

<Second Embodiment>

Using FIG. 8, the operation of a frequency specifying signal A[n:0] related to a second embodiment of the present invention will be explained. In the first embodiment, the IP 20 has taken in the system clock using the frequency specifying signal A[n:0] (see FIG. 5) and generated a timing waveform for the IP functional circuit 21 operating according to the local clock (see FIG. 6).

The operation of the frequency specifying signal A[n:0], however, is not effective only when an unknown system clock is matched with the known local clock in designing the IP 20. In a system that operates using two types of clocks, the operation of the frequency specifying signal A[n:0] is also effective when the timing of the other type of clock is matched with a change in the frequency of one type of clock.

Figure 8:
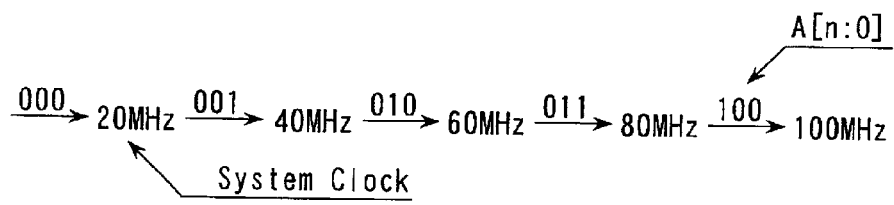
FIG. 8 is a diagram to help explain the operation of a frequency specifying signal related to a second embodiment of the present invention.

For instance, as shown in FIG. 8, even when the frequency specifying signal A[n:0] changes in this order: 000, 001, 010, 011, and 100, and accordingly the system clock changes in this order: 20 MHz, 40 MHz, 60 MHz, 80 MHz, and 100 MHz, the timing of the local clock can be caused to follow the system clock using the corresponding frequency specifying signal A[n:0].

The operation of the LSI incorporating such an IP is especially effective when the operation modes of the LSI include, for example, a low power operation mode in which a low power operation is possible by lowering the frequency of the system clock.

Furthermore, the frequency-specifying signal A[n:0] allows, for example, A[n:0] to easily include not only the frequency of the system clock but also information about changes in the form of the system clock, such as the ratio of the high level to low level of a square wave constituting the system clock.

As explained in the first and second embodiments, since unknown design data in designing the IP is only the system clock, when an LSI is developed reusing the IP, giving the specification of an LSI including the system clock and the IP inherited as intellectual property and the frequency specifying signal A[n:0] would enable computer-aided design of LSIs at least at the register transfer level (RTL).

The present invention is not limited to the above embodiments. The circuit for taking in two types of clock and making one type of clock variable for synchronization and the circuit for transmitting the access end signal from the IP in synchronization with the system clock can be realized using circuits or methods other than those explained in FIG. 7. Furthermore, this invention may be practiced or embodied in still other ways without departing from the spirit or essential character thereof.

As described above, with the IP design of the present invention, the system clock is synchronized with the local clock. In designing a bridge block for causing signal exchange between the system bus and IP, the design of the bridge block is easier, taking only the system clock into account. This increases the reusability of the IP and its peripheral functional block in developing an LSI incorporating the IP and its derivatives.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A functional block comprising:
   a system bus synchronizing with a system clock;
   a functional circuit synchronizing with a local clock; and
   a synchronizing circuit for determining the operation timing for signal exchange between said system bus and said functional circuit,
   wherein said synchronizing circuit takes in said system clock and said local clock and determines said operation timing by determining the access time of said functional circuit from said system clock,
   wherein said synchronizing circuit takes in said system clock and said local clock and determines said operation timing by creating an access end signal for said functional circuit from said system clock, and
   wherein said access end signal is created by using a counter actuated in synchronization with said system clock and a comparing circuit to compare the output of said counter with a frequency specifying signal.

2. The functional block according to claim 1, wherein the frequency of said system clock is not fixed to a specific frequency.

3. The functional block according to claim 1, wherein the frequency of said system clock is given to create design data at a register transfer level automatically.

4. A semiconductor integrated circuit comprising:
   a system bus synchronizing with a system clock;
   a functional circuit synchronizing with a local clock; and
   a synchronizing circuit for determining the operation timing for signal exchange between said system bus and said functional circuit,
   wherein said synchronizing circuit takes in said system clock and said local clock and determines said operation timing by determining the access time for said functional circuit from said system clock,
   wherein said synchronizing circuit takes in said system clock and said local clock and determines said operation timing by creating an access end signal for said functional circuit from said system clock,
   wherein said access end signal is created by using a counter actuated in synchronization with said system clock and a comparing circuit to compare the output of said counter with a frequency specifying signal.

5. The semiconductor integrated circuit according to claim 4, wherein the frequency of said system clock is not fixed to a specific frequency.

6. The semiconductor integrated circuit according to claim 4, wherein the frequency of said system clock is given to create design data at a register transfer level automatically.

* * * * *